United States Patent [19]
Weese et al.

[11] Patent Number: 6,144,759
[45] Date of Patent: Nov. 7, 2000

[54] METHOD OF DETERMINING THE TRANSFORMATION BETWEEN AN OBJECT AND ITS THREE-DIMENSIONAL REPRESENTATION, AND DEVICE FOR CARRYING OUT THE METHOD

[75] Inventors: Jürgen Weese, Henstedt-Ulzburg; Thorsten Buzug, Hamburg, both of Germany; Graeme P. Penney; David J. Hawkes, both of London, United Kingdom

[73] Assignee: U.S. Philips Corporation, New York, N.Y.

[21] Appl. No.: 09/018,985

[22] Filed: Feb. 5, 1998

[30] Foreign Application Priority Data

Feb. 14, 1997 [DE] Germany .............. 197 05 600

[51] Int. Cl.$^7$ ...................................... G06K 9/00
[52] U.S. Cl. .............................. 382/132; 382/278
[58] Field of Search ................... 382/130, 131, 382/132, 294, 128, 276, 282, 285, 278; 378/21, 24, 25, 27, 46, 62, 63

[56] References Cited

U.S. PATENT DOCUMENTS 5,359,513  10/1994  Kano et al. .............................. 382/128
5,690,106  11/1997  Bani-Hashemi et al. ............... 600/425

FOREIGN PATENT DOCUMENTS

0573345 A1  12/1993  European Pat. Off. ....... G06G 15/70

OTHER PUBLICATIONS

"A Survey of Edge Detection Techniques", Compute Graphics and Image Processing, vol. 4, No. 3, Sep. 1, 1975.

"Registration of 3–D Images Using Weighted Geometrical Features", IEEE Transactions on Medical Imaging, vol. 15, No. 6, Dec. 1, 1996.

"Voxel–Based Localization in Frame–Based and Frameless Stereotaxy and its Accuracy", Medical Physics, vol. 21, No. 8, Aug. 1, 1994.

L. Lemieux, R. Jagoe, D.R. Fish, N.D. Kitchen and D.G.T. Thomas "A Patient–To–Computed Tomography Image Registration Method Based On Digitally Reconstructed Radiographs", Medical Physics, vol. 21, No. 11, Nov. 1994, pp. 1749–1760.

Primary Examiner—Joseph Mancusco
Assistant Examiner—F. E. Cooperrider
Attorney, Agent, or Firm—Dwight H. Renfrew

[57] ABSTRACT

The invention relates to a method of determining the spatial transformation between an object which is three-dimensionally reproduced by a data set and the object itself. According to the method at least one X-ray image of the object is formed. A pseudo-projection image is calculated for a part of the volume represented by the data set, said pseudo-projection image being compared with the X-ray image. The parameters on which the calculation of the pseudo-projection image is based are varied until optimum registration is achieved.

10 Claims, 3 Drawing Sheets

6,144,759

METHOD OF DETERMINING THE TRANSFORMATION BETWEEN AN OBJECT AND ITS THREE-DIMENSIONAL REPRESENTATION, AND DEVICE FOR CARRYING OUT THE METHOD

BACKGROUND OF THE INVENTION

1. Field of the Invention

The invention relates to a method of determining the spatial transformation between an object and a three-dimensional representation of the object which can be derived from a data set, including the following steps:

a) acquiring an X-ray image of the object which is situated in an examination zone, b) deriving from the data set a pseudo-projection image which represents a projection of the object on a two-dimensional zone with defined projection geometry, c) calculating a similarity measure which characterizes the degree of registration between the X-ray image and the pseudo-projection image, d) repeating the steps b) and c) with varied projection parameters until the best registration is obtained on the basis of the similarity measure, e) determining the spatial transformation while utilizing the projection parameters of the pseudo-projection image which registers best with the X-ray image.

The invention also relates to a device for carrying out such a method.

2. Description of Related Art

In various surgical methods it is important to localize a given point exactly within the body of the patient. For example, for spine surgery it is necessary to place screws in vertebrae while it is absolutely necessary to avoid damage to the spinal cord. In other surgical interventions it is important to know the position of the aorta. To this end, a three-dimensional image of a patient to be treated is formed prior to the intervention, for example by means of a computer tomograph, and the surgical intervention is planned on the basis of this three-dimensional image. During the intervention, the patient will in general not be in the same position as during the acquisition of the data set wherefrom the three-dimensional representation of the patient is derived, so that it is necessary to determine the spatial transformations between the patient and his or her three-dimensional representation in order to enable a given point in the data set to be assigned to a point within the patient.

This is achieved by means of the described method which is known from the magazine "Medical Physics", Vol. 21, No. 11, November 1994, pp. 1749–1760. When in this method the projection parameters of the pseudo-projection image are chosen so that in relation to the image plane and the projection point the object is situated in exactly the same way as the object in relation to the radiation source and the image detector during the X-ray exposure, the pseudo-projection image and the X-ray image will register. The assignment between the object and its three-dimensional representation can then be based on these projection parameters. In order to determine the optimum projection parameters, they are varied until registration is obtained. The degree of registration is calculated by means of a similarity measure, for example by means of a cross-correlation function.

The advantage of this method resides in the fact that it is not necessary to use a reference frame or reference markers attached to the object during the acquisition of the three-dimensional data set and during the X-ray exposure. Moreover, it is not necessary either to segment the X-ray image or to indicate characteristic points in the X-ray image, or in the data set, in order to achieve an exact assignment between the X-ray image and the three-dimensional representation.

The large amount of calculation work, however, is a drawback of the known method, because the pseudo-projection images must be calculated for the entire volume represented by the three-dimensional data set. Moreover, the results are liable to become inaccurate when objects (for example, surgical instruments or the operating table) are reproduced in the X-ray image which are not imaged upon acquisition of the three-dimensional data set.

SUMMARY OF THE INVENTION

It is an object of the present invention to conceive a method of the kind set forth in such a manner that the spatial assignment between the object and its three-dimensional representation can be determined with less effort.

According to the invention this object is achieved by taking the following steps:

f) selecting a sub-volume of the examination zone prior to the derivation of pseudo-projection images, g) forming each pseudo-projection image from a part of the data set which is limited to the sub-volume, h) deriving a respective difference image either from the X-ray image and a respective pseudo-projection image or from equally filtered versions of the X-ray image and a respective pseudo-projection image, in such a manner that corresponding structures in these images cancel one another in the difference image, i) using a similarity measure which is a measure dependent on the structuredness in at least a part of the difference image.

According to the invention, not the entire volume reproduced in the three-dimensional data set is used to form the pseudo-projection images, but only a sub-volume which is of relevance to the diagnosis, for example a vertebra. The volume thereof amounts to only a fraction of the volume represented by the data set, so that the calculation of the pseudo-projection images can be substantially faster. However, the similarity measures of the known method are then inadequate, because they are based on the assumption that identical image regions are present in the X-ray image and in the pseudo-projection image. When a data set limited to the sub-volume is used for generating the pseudo-projection image, this assumption is not correct generally speaking, because the X-ray image also reproduces organs and the like which are situated in front of or behind the sub-volume. Therefore, the invention utilizes a similarity measure which is dependent on the structuredness in a difference image (or a part of the difference image) which is derived from the X-ray image and a pseudo-projection image.

The foregoing is based on the following considerations. When the sub-volume, for example the vertebra, occupies the same position in space, relative to the image plane and the projection point, during the calculation of the pseudo-projection image as during the X-ray exposure, the X-ray image and the pseudo-projection image will deviate from one another in this region in that the X-ray image also reproduces areas situated in front of and behind the vertebra. This means that in the ideal case the reproduction of the vertebra is eliminated in the difference image. In this region the difference image, therefore, contains fewer structures than the X-ray image or a difference image in which the images of the vertebra do not register. Consequently, the structuredness or the number of structures in the difference image is a suitable measure of the similarity between pseudo-projection image and X-ray image: the fewer structures are present in the difference image, the more similar the two images will be. This holds irrespective of whether the difference image is derived directly from the pseudo-projection image and the X-ray image or from filtered versions of these images.

The method can be comparatively quickly carried out, because only the voxels in the sub-volume are taken into account for calculating a projection image. The structuredness in a difference image increases when, for example a catheter which was not present during the acquisition of the data set is reproduced in the X-ray image. However, the structuredness then changes to the same extent in all difference images. The optimization of the projection parameters on the basis of the similarity measure derived therefrom, therefore, will not be influenced thereby.

The image values at the individual image points of the pseudo-projection image and of the X-ray image do not necessarily correspond, not even when the images of the sub-volume (vertebra) are situated at the same location in the pseudo-projection image and in the X-ray image. In that case the structures associated therewith in the difference image do not completely disappear. The effects thereof on the similarity measure can be reduced according to a further version of the invention in that the image values of the X-ray image and/or the pseudo-projection image are weighted by a scaling factor prior to the extraction of a difference image.

It is in principle possible to generate the data set for the three-dimensional reproduction of the object with an arbitrary imaging modality, for example an MR apparatus. However, this is restricted to special cases. Such a special case would be the imaging of a vascular system in an MR angiogram and in an X-ray image (with contrast medium). In a version of the invention, however, the data set is formed by means of a computer tomograph prior to the X-ray exposure. In a further version yet, prior to the formation of a pseudo-projection image, a constant value is subtracted from the voxel values of the voxels of the sub-volume. A voxel is to be understood to mean herein a volume element and a voxel value is to be understood as the absorption value associated with a voxel. It can thus be avoided that a brightness gradient, which could have negative effects on the quality of the similarity measure in given circumstances, occurs at the edges of the image area in which the sub-volume is projected.

In a further version of the invention, the number of pixels in the difference image, or in a part thereof, whose image values deviate from the image values of neighboring pixels is determined so as to determine the structuredness. The more pixels (an image element is called a pixel) in the difference image have an image value which deviates from the image values of its neighboring pixels, the larger the structuredness will be, so that this number of pixels represents a suitable similarity measure.

In a further version of the invention, the calculation of the similarity measure utilizes a weighting function which weights the difference between the image values of neighboring pixels and produces a first value in the case of small differences and a second value, which deviates from the first value, in the case of large values, the differences weighted by the evaluation function being summed. This weighting function ensures that small deviations between the image values, for example due to noise, do not have an effect on the similarity measure whereas in the case of deviations exceeding a given magnitude the image values are evaluated to be different, regardless of the degree of deviation.

In this context it does not make sense to compare the image values of pixels which are situated far apart, because such large-volume differences of image values may also have other causes. Therefore, in a further version of the invention only the image values of pixels situated within a circle around the relevant pixel are taken into account in order to calculate the similarity measure for each pixel. In order to decide whether or not a pixel is located within a structure, only the pixels which are situated within a given radius around the relevant pixel are taken into account.

In a further version yet, the similarity measure is calculated from the image values of the pixels of a difference image in conformity with the relation $$P = \sum_{i,j} \sum_{k,l} \frac{1}{1 + \frac{1}{\sigma^2}(I_d(i,j) - I_d(i+k, j+l))^2}$$

where i,j are the pixels of at least a part of the difference image, $I_d(i,j)$ are the associated image values, σ is a selectable parameter, and k,l are integer values which satisfy the relation $r^2 \geq k^2 + l^2$, where r is a selectable parameter.

Using the similarity measure thus obtained, the spatial assignment between the object, or the X-ray image of the object, and its three-dimensional representation, derived from the data set, can be very accurately determined.

Further the difference image may be derived from spatially filtered versions of the X-ray image and a psuedo-projection image, in which case the similarity measure is determined in such a manner that a large value is assigned to pixels having a small image value and a small value is assigned to pixels having a large image value.

A device for carrying out the method as described above includes a first imaging device for forming a data set which three-dimensionally reproduces an object, and an X-ray device for forming X-ray images of the object situated within an examination zone, means for deriving pseudo-projection images from the data set, means for calculating the degree of registration between the X-ray image and a similarity measure characterizing a respective pseudo-projection image, and an image processing unit which is programmed in such a manner that the following image processing operations are carried out:

A) selecting a sub-volume of the examination zone prior to the extraction of pseudo-projection images, B) generating each pseudo-projection image from a part of the data set which is limited to the sub-volume, C) deriving a respective difference image either from the X-ray image and a respective pseudo-projection image or from equally filtered version of the X-ray image and a respective projection image, in such a manner that the same structures in these images cancel one another in the difference image, D) using a similarity measure which is a measure on the structuredness in at least a part of the difference image.

BRIEF DESCRIPTION OF THE DRAWINGS

The invention will be described in detail hereinafter with reference to the drawings. Therein.

DETAILED DESCRIPTION OF THE PREFERRED EMBODIMENTS

Figure 1:
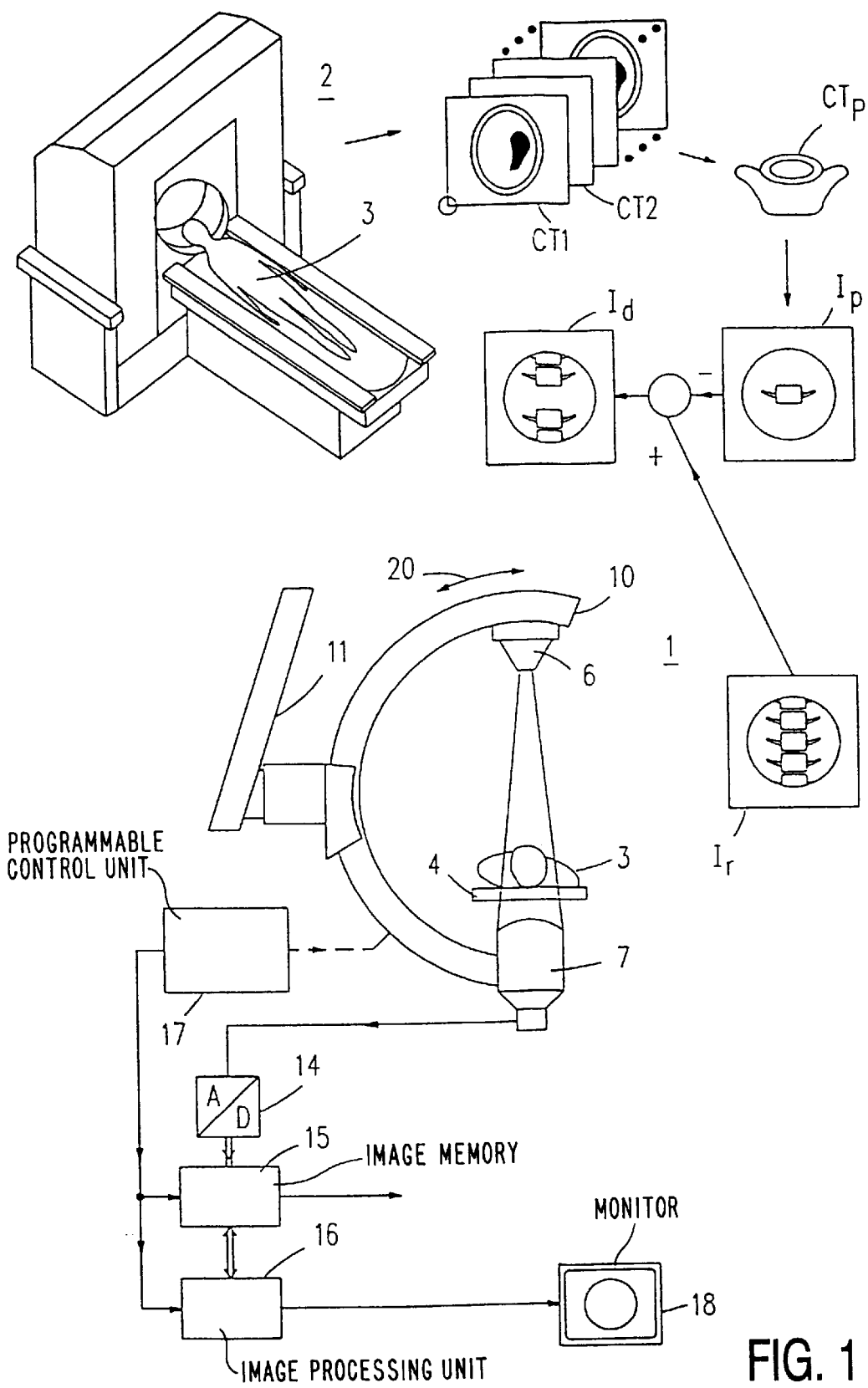
FIG. 1 diagrammatically illustrates the method of the invention.

FIG. 1 shows a computer tomograph 2 which is used to form a series of computer tomograms CT1, CT2 etc. of a patient 3 prior to a surgical intervention, said tomograms representing parallel slices which extend perpendicularly to the longitudinal axis of the patient. These computer tomograms form a data set for the three-dimensional reproduction of the patient. The surgical intervention to be performed at a later stage can be accurately planned on the basis of this data set.

A sub-volume $CT_p$ which is separately shown in FIG. 1 and is of relevance to the later intervention, is selected for this purpose. The sub-volume may be a cube which contains a part of the patient, for example a vertebra, which is essential to the later intervention. However, the vertebra itself may also constitute this sub-volume. To this end, the sub-volume must be segmented either automatically or manually. This is a comparatively time-consuming operation which, however, is not disturbing since it is performed prior to the beginning of the surgical intervention.

After this preparation phase, an X-ray image is formed before the start of or during the surgical intervention while the patient 3 is arranged on an operating table 4 in an operating room. The X-ray image can be formed by means of an X-ray examination apparatus in which an X-ray source 6 and an image pick-up device 7 are mounted on a C-arm which is supported by a stand 11 (not shown). The C-arm with the X-ray source 6 and the image detector 7 can be pivoted about at least one horizontal axis as required.

The X-ray image pick-up device 7, for example an X-ray image intensifier whereto a television chain is connected, supplies its output signals, via an analog-to-digital converter 14, to an image memory 15 which is connected to an image processing unit 16 which is also capable of processing the data set which is formed by the computer tomograph 2 and may be stored in the image memory 15 or in a separate image memory. The image processing unit 16 is connected to a display monitor 18. The above components are controlled by a programmable control unit 17.

Figure 2:
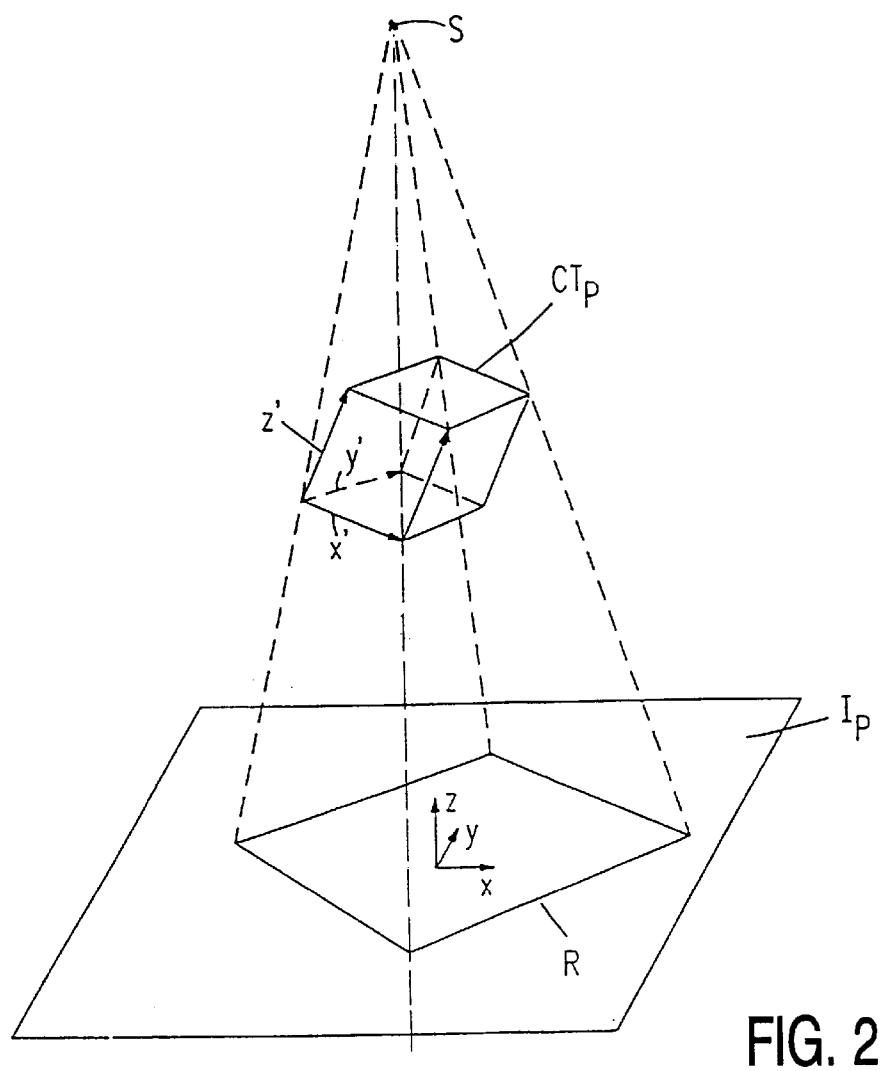
FIG. 2 shows the formation of a projection image of a sub-volume.

The transformation in space, or the assignment between the image of the patient, notably of the segmented vertebra, represented by the CT data set and the position of this vertebra in space, is determined by means of the X-ray image. In order to determine this transformation, moreover, pseudo-projection images $I_p$ are formed of the sub-volume $CT_p$ as diagrammatically shown in FIG. 2. The size of the pseudo-projection image $I_p$ corresponds to the size of the X-ray image. The position of the projection point S, wherefrom the sub-volume is projected into the pseudo-projection image, in relation to this image corresponds to the position of the X-ray source 6 (or the focal spot of the X-ray source emitting the X-rays) in relation to the image pick-up device 7 during the X-ray exposure. FIG. 2 shows that the projection of the sub-volume $CT_p$ in the pseudo-projection image $I_p$ covers only a section whose border is denoted by the letter R.

In general, the starting position of the sub-volume $CT_p$ initially selected in relation to the projection point S and the projection direction does not correspond to the position and the orientation of the real sub-volume in relation to the X-ray source 6 and the image pick-up device 7 during the acquisition of the X-ray image. Therefore, these projection parameters (i.e. the position and the orientation) of the sub-volume in relation to the projection point S and the plane of the projection image $I_p$ are varied and projection images are calculated using said varied projection parameters.

FIG. 1 shows a pseudo-projection image $I_p$ and the X-ray image $I_r$ acquired the imaging system 6, 7. A difference image $I_d$ is derived from these two images, the image of the vertebra $CT_p$ being cancelled out in the difference image if the position and orientation of the vertebra $CT_p$ underlying the pseudo-projection image correspond to the position and orientation of the real vertebra in relation to the X-ray source 6 and the image pick-up device 7.

Figure 3:
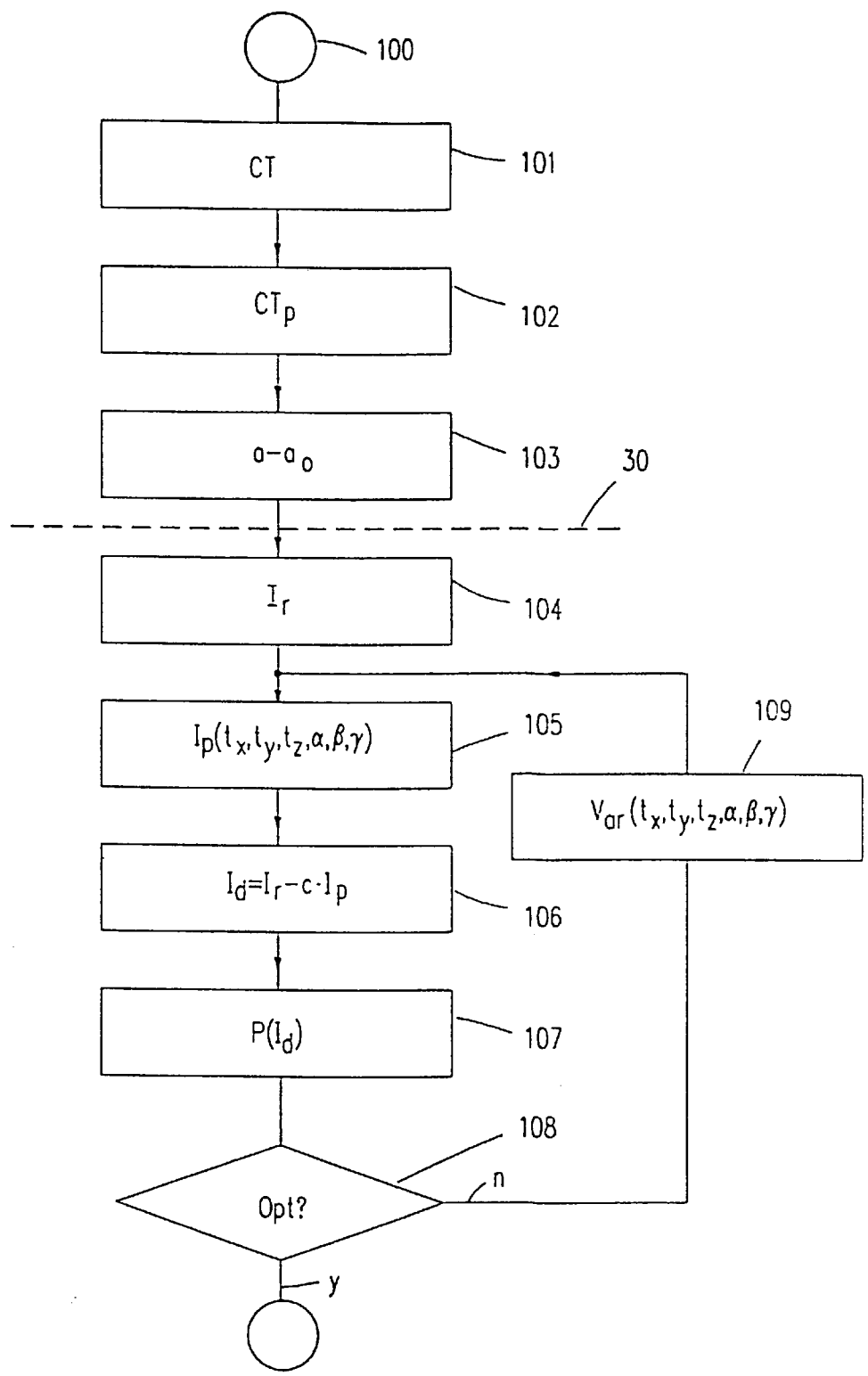
FIG. 3 shows a diagram illustrating the execution of the method.

The method according to the invention will be illustrated in detail again on the basis of the flow chart of FIG. 3.

After the initialization (100), a data set of the patient, which three-dimensionally represents the absorption distribution within a volume to be examined, is acquired by means of the computer tomograph 2 (step 101). A voxel value which represents the X-ray absorption of the relevant voxel is thus assigned to each voxel within the volume to be examined.

During the next step (102), a sub-volume $CT_p$ (FIG. 1) is selected from the volume to be examined. This sub-volume corresponds to only a fraction of the original volume to be examined, for example a one twentieth part or less. It contains the part of the examination zone which is relevant to the intervention and which is preferably rigid, for example a vertebra. Selection can be performed manually (by presetting a cube enclosing the volume) but also automatically by segmentation.

In the step 103 a constant value $a_0$ which corresponds to the mean value of the absorption in the vicinity of the sub-volume or the segmented vertebra is subtracted from the (location-dependent) voxel values a of the voxels present in the sub-volume. The voxels of the sub-volume are thus assigned voxel values which correspond to the difference between the absorption of the relevant voxel and the vicinity. This prevents the appearance of edges or brightness transients at the area of the borders (R—FIG. 2) in the difference image $I_d$ at a later stage. During the further process steps, only the voxel values of the voxels of the sub-volume thus calculated are taken into account. The voxels present outside the sub-volume are no longer involved in the further method.

The steps 101 to 103 are performed prior to the actual intervention, as is denoted by the dashed line 30. Subsequently, the patient 3 is arranged on the operating table 4 and an X-ray image $I_r$ is acquired (step 104). The position and orientation of the imaging system 6, 7 in relation to the operating table 4, or the space in which the operation is performed, are recorded by an appropriate system which is not shown in FIG. 1.

During the next step (105) a pseudo-projection image $I_p$ of the selected sub-volume $CT_p$ is calculated, based on the same position of the projection point S in relation to the image plane of the projection image $I_p$ as that of the X-ray source 6 in relation to the entrance screen of the image pick-up device 7 during the acquisition of the X-ray image. An image value for a pixel in the projection image is derived from the voxel values (absorption values) of all voxels of the sub-volume which are on the connecting line between the pixel and the projection point S. This is repeated for all pixels of the projection image until completion of the pseudo-projection image.

This pseudo-projection image is dependent on the position of the sub-volume $CT_p$ and its orientation in relation to a fixed co-ordinate system x', y', z'. Therefore, each projection image can be characterized by six projection parameters which represent, in the co-ordinate system, the position (these parameters are denoted by the references $t_x$, $t_y$ and $t_z$) and the angular position or the orientation (these parameters are denoted by the references $\alpha, \beta$ and $\gamma$) of the sub-volume in relation to the fixed co-ordinate system.

The pseudo-projection image and the X-ray image should comprise the same number of pixels, for example 128×128 pixels. If the original images have a higher resolution, for example 512×512 pixels, they are subjected to an appropriate low-pass filtering operation and the image value of each pixel is derived from the image values of several (16) pixels of the original image. The pseudo-projection image and the X-ray image should also have a comparable image sharpness. When the image sharpness of the pseudo-projection image is less than that of the X-ray image because of the resolution of the CT data set, a reproduction of higher resolution of the sub-volume $CT_p$ is derived from the CT data set by interpolation.

During the next steps it must be determined to what extent the position and orientation of the sub-volume $CT_p$ assumed for the calculation of the projection image correspond to the position and the orientation of the real sub-volume in relation to the imaging system 6, 7 during the formation of the X-ray image. To this end, in the step 106 first a difference image $I_d$ is derived from the X-ray image $I_r$ and the projection image $I_p$. To this end, the image values of the corresponding pixels in the X-ray image $I_r$ and the pseudo-projection image $I_p$ need not necessarily be subtracted from one another; when a low image value is associated with an area of high absorption in the pseudo-projection image and a high image value is associated with such an area in the X-ray image, the image values must be added. Whenever the term difference image is used hereinafter, it is to be understood to include such an additive superposition. It is only essential that the superposition is performed in such a manner that corresponding structures, being in the same location in the X-ray image and in the projection image, cancel one another in the difference image.

Because the voxel values of the sub-volume and the image values of the X-ray image are not acquired with the same imaging system, it may additionally be necessary to adapt the two image values in respect of dynamic range by weighting either the image values of the X-ray image $I_r$ or the image values of the pseudo-projection image $I_p$ with a scaling factor c before subtracting (or adding) these values.

During the next step (107), a similarity measure is formed on the basis of the difference image $I_d$ or a part of the difference image which is determined by the contours R of the projection image (see FIG. 2). This similarity measure is based on the following considerations.

If, in the ideal case, the calculation of the pseudo-projection image is based on the same position and orientation of the sub-volume in relation to the projection point and the image plane (see FIG. 2) as the position and orientation of the (real) sub-volume in relation to the X-ray source or the image pick-up device during the acquisition of the X-ray image, the reproduction of the sub-volume will be at the same location in the pseudo-projection image and in the X-ray image. These images cancel one another in the difference image. The difference image (or a section thereof) in that case contains only a minimum amount of structures. In the case of deviations from the ideal case, more structures will be present in the difference image. Therefore, the structuredness is a suitable similarity measure: the fewer structures are present in the difference image, the more similar the X-ray image $I_r$ and the pseudo-projection image $I_p$ will be.

A pixel is considered to belong to a structure if it is as distinct as possible from an as large as possible number of its neighboring pixels. However, only the pixels whose center is located within a circle of radius r around the relevant pixel are considered to be neighboring pixels. A suitable value for r may be, for example from two to ten times the pixel width; for example, r amounts to three times the pixel width in the case of an image comprising 128×128 pixels.

For the calculation of the similarity measure or the structuredness, the difference between the image values of neighboring pixels should be weighted by means of an weighting function which tends to a first value, for example the value one, in the case of small differences and to a second value, for example the value zero, in the case of large differences and which varies monotonously in the transitional zone between large and small values.

Figure 4:
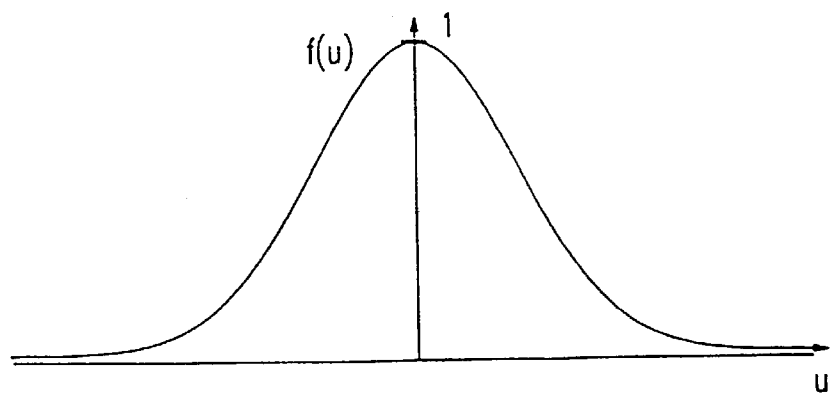
FIG. 4 shows the weighting function with which the different image values in the difference image are weighted.

FIG. 4 shows such an weighting function, the difference u between the image values of two neighboring pixels being plotted on the abscissa and the associated weighting function f(u) on the ordinate. It appears that for small differences u the function f(u) has a function value which deviates only slightly from the maximum value (one), whereas it asymptotically tends to the value zero for large differences. It is thus achieved that small deviations, for example as caused by noise, are evaluated in approximately the same way as corresponding image values, and that large deviations are evaluated independently of their magnitude. In the transitional zone the function f(u) varies monotonously and it also has a point of inflection in this zone.

The weighting function f(u) can be derived from a look-up table which assigns a value f(u) in conformity with FIG. 4 to each input value, i.e. to each difference u between two image values. However, it is also possible to calculate f(u) analytically, for example in conformity with the relation:

$$f(u) = e^{-\frac{u^2}{\sigma^2}} \tag{1}$$

Therein, $\sigma$ is a suitably chosen parameter. It is a drawback that a comparatively large amount of calculation work is required for the calculation of the exponential function f(u). A function which can be calculated more quickly is obtained from the equation:

$$f(u) = \frac{1}{1 + \frac{u^2}{\sigma^2}} \tag{2}$$

A suitable value is $\sigma=10$ (if the dynamic range of the X-ray image or the projection image is between 0 and 255). For image value differences u amounting to one third of the value $\sigma$ or less, f(u) has a value of 0.9 or more, whereas f(u) has a value of less than 0.1 for image value differences amounting to more than three times $\sigma$.

Thus, a similarity measure which is dependent on the structuredness is obtained in conformity with the relation $$P = \sum_{i,j} \sum_{k,l} f(I_d(i,j) - I_d(i+k, j+l)) \quad (3)$$

Therein, i,j represent the co-ordinates of a pixel in the difference image, or in a difference image section, and $I_d(i,j)$ represent the image values associated with this pixel. k,l are integers for which:

$$r^2 \geq k^2 + l^2 \quad (4)$$

where r defines the radius of the circle within which the pixels neighbor the pixel i,j. The summand f() in the equation (3) corresponds to f(u), so that for u:

$$u = I_d(i,j) - I_d(i+k, j+1) \quad (5)$$

It appears from the equation (3) that for a given pixel i,j the differences between the image value $I_d(i,j)$ of this pixel and the image values $I_d(i+k,j+l)$ of the neighboring pixels must be weighted with the weighting function f(u) and that the sum over these weighting functions must be calculated. This must be repeated for all pixels i,j, at least in the image section R, and the sum values obtained must be summed in their turn.

When the equation (5) is inserted in the equation (2), the following equation is obtained for calculating the similarity measure P:

$$P = \sum_{i,j} \sum_{k,l} \frac{1}{1 + \frac{1}{\sigma^2}(I_d(i,j) - I_d(i+k, j+l))^2} \quad (6)$$

In the foregoing description of the step 107 first the images $I_r$ (X-ray image) and $I_p$ (pseudo-projection image) were subtracted pixel-by-pixel from one another so as to obtain the difference image, and subsequently the difference between the image values of pixels neighboring one another in this difference image was used to determine the similarity measure. However, the procedure may also be reversed so that first the difference between the image values of neighboring pixels is determined separately for the image $I_r$ and $I_{pr}$ and subsequently a difference image is derived from the difference of the images thus modified. This difference image will again contain fewer structures as the correspondence between $I_r$ and $I_p$ is better. More specifically, the following then holds.

First the difference between the image values of neighboring pixels is determined for $I_r$ and $I_p$ separately, so that so-called gradient images, for example having a gradient in the i direction, are obtained in conformity with the relation $$I_{gri}(i,j) = I_r(i-1,j) - I_r(i+1,j) \quad (7)$$

or $$I_{gri}(i,j) = I_p(i-1,j) - I_p(i+1,j) \quad (8)$$

Analogously, gradient images can also be formed for the j direction:

$$I_{gri}(i,j) = I_p(i,j-1) - I_p(i,j+1) \quad (9)$$

or $$I_{gri}(i,j) = I_r(i,j-1) I_r(i,j+1) \quad (10)$$

Therefrom (gradient) difference images are derived in conformity with the relation:

$$I_{dgi}(i,j) = I_{gri}(i,j) - cI_{gpi}(i,j) \quad (11)$$

or $$I_{dgj}(i,j) = I_{grj}(i,j) - cI_{gpj}(i,j) \quad (12)$$

where c is a suitably chosen constant (preferably chosen such that the spatial mean value is the same in both images).

Analogously to the equation 6, the following, structuredness-dependent similarity measure is determined:

$$P = \sum_{i,j} \frac{1}{1 + \frac{1}{\sigma_i^2} I_{dgi}(i,j)} + \sum_{i,j} \frac{1}{1 + \frac{1}{\sigma_j^2} I_{dgJ}(i,j)^2} \quad (13)$$

therein, $\sigma_i$ and $\sigma_j$ are suitably chosen parameters. It again hlds that P assumes a maximum value if the reproductions of the sub-volume are situated in the same location in the pseudo-projection image and in the X-ray image or if the difference image contains a minimum amount of structures.

It may suffice in principle and the j direction a gradient image for only one of the two directions from the images $I_r$ and $I_p$ so that only the equations 7, 8, 11 or 9, 10, 12 need be solved and one of the two sums in the equation 13 disappears. However, the accuracy of the method could then be affected in unfavourable circumstances.

The gradient images in conformity with the equations 7–10 represent the first derivation of the images $I_r$ or $I_p$ in the direction i or j. However, it is also possible to use instead a higher derivative or different spatial filtering, preferably filtering which enhances the reproduction of edges in the images $I_r$ or $I_p$, for example two-dimensional high-pass filtering.

After the step 107 it is checked whether the similarity measure P has already reached an optimum value (step 108). If this is not the case, the steps 105 . . . 108 are executed again after variation of the projection parameters of the pseudo-projection image is calculated in the step 109.

Preferably, only one of the six projection parameters is then varied, initially with a comparatively large step in order to recognize where the similarity measure P is optimum, i.e. where it has its maximum value. Subsequently, the other projection parameters are also varied until the absolute maximum of the similarity measure is obtained in the six-dimensional projection parameter space. The variation of the six projection parameters, relative to their initial value selected for the first execution of the loop 105 . . . 108, enables accurate determination of the position of the vertebra represented by the segmented sub-volume. The method is completed (110) after the optimum has been found in this manner.

If desired, the difference image associated with the optimum can be displayed on the monitor in order to offer the physician a visual check of the registration. The vertebra should not be reproduced in this difference image or only hardly so.

As it results from the equation (6), it is not absolutely necessary that the image values for all pixels of the difference image are simultaneously available after the step 105. In this case it would suffice, if only the pixels of a small part of the difference image or the section R (FIG. 2) were calculated and the associated part of the similarity measure P was determined, followed by calculation of the image values of another part of the difference image. Therefore, it is not necessary for all image values of the difference image, or also of only the section, to be present simultaneously; in the context of the invention the term "difference image" should also relate to these cases in which the image values, at least for the section R, are temporally successively available. However, it is advisable to have all image values of the difference image or of the section simultaneously available in stored form, because otherwise the individual image values would have to be calculated several times as demonstrated by the equation (1) or the equation (6).

In the foregoing the sub-volume for a vertebra was selected. However, other anatomical regions can also be segmented as sub-volumes, for example bone structures or the aorta filled with a contrast medium (or a part thereof). It is only important that the structures whereto the sub-volume is limited have an X-ray absorption which is higher or lower than that of the surrounding structures. Moreover, these structures should be stationary or be rigidly connected to a rigid part, like the aorta to the vertebral column.

The method according to the invention enables very accurate determination of the assignment or transformation in the x direction and the y direction, i.e. in the direction perpendicular to the line connecting the X-ray source 6 to the image pick-up device 7. The determination, however, is substantially less accurate in the direction of this central ray. This can be avoided by acquiring a second X-ray image with a beam path extending perpendicularly to that used for the first image; the object has to remain in the same position as during the first exposure and the method according to the invention is also performed using said second X-ray image. Alternatively, the two X-ray images can also be simultaneously used. In that case two pseudo-projection images should be calculated in the step 105 of the flow chart of FIG. 3, taking into account the different beam paths. In the step 106 two difference images can then be derived from the two projection images and the two X-ray images. In the step 107 similarity measures are derived from the two difference images, said similarity measures being suitably combined, for example added.

All references cited herein, as well as the priority document German Patent Application 19705600.8 filed Feb. 14 1997, are incorporated herein by reference in their entirety and for all purposes to the same extent as if each individual publication or patent or patent application was specifically and individually indicated to be incorporated by reference in its entirety for all purposes.

What is claimed is:

1. A method of determining the spatial transformation between an object and a three-dimensional representation of the object derived from a data set, the method comprising:

acquiring an X-ray image of the object which is situated in an examination zone, selecting a sub-volume of the examination zone, deriving from a part of the data set which is limited to the sub-volume a pseudo-projection image sub-volume on a two-dimensional zone with defined projection geometry deriving a respective difference image either from the X-ray image and the pseudo-projection image or from equally filtered versions of the X-ray image and the pseudo projection image, in such a manner that corresponding structures in these images cancel one another in the difference image, calculating a similarity measure which is a measure dependent on the structuredness in at least a part of the difference image, repeating the steps of deriving a pseudo-projection image, deriving a difference image, and calculating a similarity measure with varied projection parameters until the best registration is obtained on the basis of the similarity measure, determining the spatial transformation while utilizing the projection parameters of the pseudo-projection image which registers best with the X-ray image.

2. A method as claimed in claim 1, characterized in that the image values of the X-ray image and/or the pseudo-projection image are weighted by a scaling factor (c) prior to the extraction of a difference image.

3. A method as claimed in claim 1, characterized in that the data set is formed by means of a computer tomograph (2) prior to the X-ray exposure.

4. A method as claimed in claim 3, characterized in that a constant value ($a_0$) is subtracted from the voxel values (a) of the voxels of the sub-volume prior to the formation of a pseudo-projection image.

5. A method as claimed in claim 1, characterized in that the number of pixels in the difference image, or in a part thereof, whose image values deviate from the image values of neighboring pixels is determined so as to determine the structuredness.

6. A method as claimed in claim 5 wherein the calculation of the similarity measure utilizes an weighting function (f(u)) which weights the difference between the image values ($I_d(i,j)$) of neighboring pixels and produces a first larger value in the case of small differences (u) and a smaller second value, which deviates from the first value, in the case of large values, the differences weighted by the weight function being summed.

7. A method as claimed in claim 6, characterized in that only the image values of pixels (i+k,j+l) situated within a circle around the relevant pixel (i,j) are taken into account in order to calculate the similarity measure (P), for each pixel (i,j).

8. A method as claimed in claim 6, characterized in that the similarity measure (P) is calculated from the image values ($I_d(i,j)$) of the pixels (i,j) of a difference image in conformity with the relation $$P = \sum_{i,j} \sum_{k,l} \frac{1}{1 + \frac{1}{\sigma^2}(I_d(i,j) - I_d(i+k, j+l))^2}$$

where i,j are the pixels of at least a part of the difference image, $I_d(i,j)$ are the associated image values, σ is a selectable parameter, and k,l are integer values which satisfy the relation $r^2 \geq k^2 + l^2$, where r is a selectable parameter.

9. A method as claimed in claim 1, in which the difference image ($I_{dgi}$, $I_{dgi}$) is derived from equally filtered versions ($I_{gri}$, $I_{gpi}$) of the X-ray image ($I_r$) and the pseudo-projection ($I_p$), characterized in that the similarity measure is determined in such a manner that a large value is assigned to pixels having a small image value and a small value is assigned to pixels having a large image value, the values thus obtained for the pixels of the difference image being summed.

10. A device for carrying out the method as claimed in claim 1, the device comprising:

a first imaging device for forming a data set which three-dimensionally reproduces an object, an X-ray device for forming X-ray images of the object located within an examination zone, means for deriving pseudo-projection images from the data set, means for calculating a similarity measure characterizing the degree of registration between the X-ray image and a respective pseudo-projection image, and an image processing unit which is programmed in such a manner that the following image processing operations are carried out:

selecting a sub-volume of the examination zone prior to the generation of pseudo-projection images, generating each pseudo-projection image from a part of the data set which is limited to the sub-volume, deriving a respective difference image either from the X-ray image and the pseudo-projection image or from equally filtered versions of the X-ray image and the pseudo- projection image in such a manner that the same structures in these images cancel one another in the difference image, using a similarity measure which is a measure dependent on the structuredness in at least one part of the difference image.

* * * * *